United States Patent [19]
Minne et al.

[11] Patent Number: 5,858,256
[45] Date of Patent: Jan. 12, 1999

[54] METHOD OF FORMING SMALL APERTURE

[75] Inventors: Stephen C. Minne, Danville, Ill.;
Calvin F. Quate, Stanford, Calif.

[73] Assignee: The Board of Trustees of the Leland Stanford, Jr. University, Stanford, Calif.

[21] Appl. No.: 679,687

[22] Filed: Jul. 11, 1996

[51] Int. Cl.$^6$ .................................................. B29D 11/00
[52] U.S. Cl. .............................. 216/24; 216/12; 438/700; 438/734; 438/31; 438/928; 438/947
[58] Field of Search .................................. 216/12, 24, 56; 438/734, 31, 700, 947, 928

[56] References Cited

U.S. PATENT DOCUMENTS

| | | | |
|---|---|---|---|
| 3,962,052 | 6/1976 | Abbas et al. | 204/129.3 |
| 4,449,287 | 5/1984 | Maas et al. | 29/580 |
| 4,654,119 | 3/1987 | Cook et al. | 156/649 |
| 4,735,681 | 4/1988 | Alvarez | 156/652 |
| 5,326,426 | 7/1994 | Tam et al. | 156/643 |
| 5,484,507 | 1/1996 | Ames | 156/644.1 |
| 5,520,297 | 5/1996 | Kagami et al. | 216/12 |

OTHER PUBLICATIONS

H.I. Liu et al., "Self–limiting oxidation of Si nanowires", J. Vac. Sci. Technol. B, vol. 11, No. 6, Nov./Dec. 1993, pp. 2532–2537.

H.I. Liu et al., "Self–limiting oxidation for fabricating sub–5 nm silicon nanowires", Appl. Phys. Letr. (64) 11, 14 Mar. 1994 American Institute of Physics, pp. 1383–1385.

*Primary Examiner*—Marion E. McCamish
*Assistant Examiner*—Cheryl Juska
*Attorney, Agent, or Firm*—Skjerven, Morrill, MacPherson, Franklin, & Friel LLP; David E. Steuber

[57] ABSTRACT

A thick column is formed by masking and etching a substrate, and the column is thinned to a very small diameter (e.g., $\leq 5$ nm) by oxidizing the column and removing the oxide layer. A metal layer is deposited on the surface of the substrate, and the column and substrate are etched to form a pit. The backside of the substrate is etched to form an aperture surrounded by the metal layer. Alternatively, the metal layer is removed and a dopant layer is implanted into the substrate, followed by the etching of the backside, leaving an aperture surrounded by the dopant layer. In a second alternative, the oxidized column is broken from the substrate, and the backside is etched, leaving an aperture surrounded by an oxide layer. These processes can be used to fabricate apertures of very small and reproducible dimensions for such instruments as near field scanning optical microscopes and scanning ion conductance microscopes.

21 Claims, 3 Drawing Sheets

FIG. 2F

METHOD OF FORMING SMALL APERTURE

GOVERNMENT CONTRACTS

The following subject matter was developed partially with the support of JSEP grant #2WMN253. The U.S. Government may have certain rights to this subject matter.

FIELD OF THE INVENTION

This invention relates to a method of forming a very small aperture. Small apertures are used in instruments such as near field scanning optical microscopes (NSOMs) and scanning ion conductance microscopes (SICMs).

BACKGROUND OF THE INVENTION

There are a number of technologies in which a very small aperture is required.

Near field scanning microscopy, for example, is a technique for analyzing objects by means of a light beam which is smaller than the wavelength of the light. To obtain a light source of subwavelength dimensions, light is directed through an aperture formed in a thin opaque screen and having a width less than one-half the wavelength ($\lambda$) of the light, frequently substantially smaller than the wavelength (e.g., $\lambda/20$). The sample to be studied is positioned in the "near field" of the light source, which begins at the aperture and extends outward a distance equal to about one-half of the width of the aperture, wherein the light emerging from the aperture remains collimated.

To obtain a complete image, the sample is typically scanned. During scanning, the aperture must be maintained at a constant distance from the sample. U.S. Pat. No. 5,354,985 to Quate, which is incorporated herein by reference in its entirety, describes an NSOM in which an optical waveguide is formed along the longitudinal axis of a cantilever. During scanning, the cantilever is positioned parallel to the surface of the sample. A tip is formed near the free end of the cantilever, and the small aperture is formed at the apex of the tip by a focused ion beam process. The cantilever approaches the sample until the apex of the tip is located extremely close to the sample surface. Optical radiation is introduced into the waveguide and transmitted to the tip, where the radiation exits through the aperture. The tip-sample separation is held constant by operating the cantilever in the manner of an atomic force microscope operating in the non-contact or attractive mode. The non-contact or attractive mode is described in numerous sources, including for example Y. Martin et al., "Atomic Force Microscope Force Mapping And Profiling On A Sub-Hundred Angstrom Scale", Journ. App. Phys., Vol. 6, pp. 4723–4729, March 1987.

The NSOM can be operated in the transmission mode, where the sample is analyzed by detecting the light which passes through the sample, or the reflection mode, where the sample is analyzed by detecting the light reflected from the sample.

Another instrument which requires a very small aperture is a scanning ion conductance microscope. In a scanning ion conductance microscope, a very small aperture is formed in a body, typically a pipette, and the body is immersed in an electrolytic bath. An ionic current flows from an electrode located on one side of the body, through the aperture, to one of two electrodes located on the other side of the body in the electrolytic bath.

The resolution obtainable in an NSOM or SICM varies inversely with the width of the aperture and the thickness of the material in which it is formed. In an NSOM, for example, the width of the aperture is normally from $\frac{1}{10}$ to $\frac{1}{20}$ of the wavelength of the light being used, or in the range of 15–100 nm. Moreover, for commercial instruments the aperture width and thickness should also be predictable and should be repeatable from one manufacturing batch to another.

SUMMARY OF THE INVENTION

The method of this invention is capable of providing an aperture having a width of less than 5 nm and having a controllable thickness.

The method begins with an extremely thin "column" that is formed in a substrate by known techniques which include oxidizing a relatively thick pillar until a thin core of intrinsic material remains. The oxide is then removed, leaving the core, which forms a thin column extending from a flat surface on the frontside of the substrate.

The tip of the column and the exposed surface of the substrate are coated with a metal such as chromium, and the column is etched isotropically to lift off the metal coating on its tip. The substrate is then etched, using the remaining portion of the metal coating on the surface of the substrate as a mask, to form a narrow pit in the substrate. Finally, the backside of the substrate is etched until a thin screen surrounding the opening to the pit (the aperture) remains.

In one embodiment the metal coating is left on the flat surface of the substrate and the substrate material, preferably silicon, is etched from beneath the metal coating. The thickness of the metal coating thus determines the thickness of the aperture. In another embodiment the metal coating is removed, and the frontside of the substrate is implanted with dopant. The backside of the substrate is then etched, with the doped layer providing an etch-stop which determines the thickness of the aperture. The substrate can be oxidized again to reduce the diameter of the aperture, and the oxide which forms of the surfaces of the screen can either be left in place, thereby increasing the thickness of the aperture, or removed, leaving the aperture with a thickness slightly less than that of the doped layer.

In yet another embodiment the oxide layer which is initially used to fabricate the thin column is left in place, and the frontside of the substrate is polished, thereby breaking off the column. A passivation layer is formed on the frontside to provide support for the structure, and the backside of the substrate is etched. The passivation layer is then removed, leaving an aperture formed in the oxide layer. In this embodiment, the thickness of the aperture is determined by the thickness of the oxide layer that is used to fabricate the thin column.

An aperture formed by the method of this invention can be used in any instrument or apparatus that requires a very small, reproducible aperture, including but not limited to, near field scanning optical microscopes and scanning ion conductance microscopes.

BRIEF DESCRIPTION OF THE DRAWING

FIGS. 2A–2F illustrate the steps of a process according to a first embodiment of this invention, wherein the thickness of the aperture is determined by the thickness of an implanted doped layer.

DESCRIPTION OF THE INVENTION

Preliminary to the method of this invention, a thin silicon column or "nanowire" must be formed. The manner of preparing the column is known in the art.

Figure 1A:
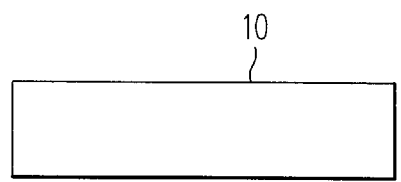
FIGS. 1A–1E illustrate the steps of a process of forming a thinned silicon column which is preparatory to the process of this invention.
Figure 1B:
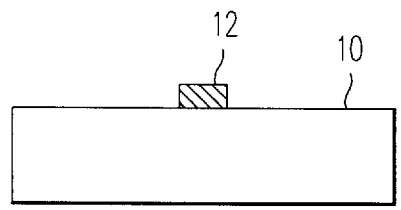

The steps of fabricating the silicon column are illustrated in FIGS. 1A through 1E. The starting stock is a silicon substrate 10 shown in FIG. 1A. Substrate 10 is preferably a (100) crystal and is doped with N-type dopant to a concentration of $1 \times 10^{18}$ cm$^{-3}$. Substrate 10 is spin coated with a 40 nm thick layer of poly(methylmethacrylate) (PMMA) resist, and the resist is exposed in a circular dot pattern using electron beam lithography. The resist may be exposed in other dot patterns including arrays or lines. A typical electron beam lithography system operating in large beam mode (~60 nm resolution) with an exposure of 80 $\mu$C/cm$^2$ performs acceptably in forming the dot pattern. The dots of resist are removed by the lithography process, and a 10 nm thick chromium layer is evaporated onto the substrate. Using a lift-off process, the resist and overlying chromium is removed, leaving dots of chromium that are in contact with the silicon surface. A chromium dot 12, measuring less than 100 nm in diameter, is shown in FIG. 1B. A smaller chromium dot 12 may be produced if a higher dot pattern density is desired.

Figure 1C:
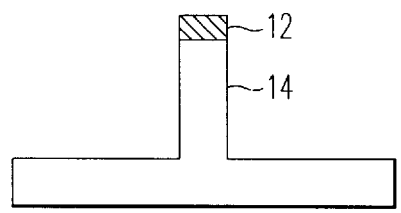

Substrate 10 is etched with a reactive ion etch (RIE) using a NF$_3$ plasma. A Cl$_2$ plasma may also be used but an NF$_3$ plasma yields more uniform columns. The NF$_3$ plasma is at a pressure of 20 mTorr and an NF$_3$ flow rate of 20 sccm. The electrode temperature is at 21° C. and the incident rf power is 0.5 W/cm$^2$. The plasma self bias of 430 V. This yields a silicon column 14 about 1 $\mu$m tall as shown in FIG. 1C. The NF$_3$ etch operates at about 30 nm/min and ranging from 37 nm/min for $10^{18}$ cm$^{-3}$ arsenic-doped n-type material to 26 nm/min for $10^{18}$ cm$^{-3}$ boron-doped p-type material. The vertical etch undercuts the chromium dot laterally at a rate of about 1 nm/min, depending on the dot pattern density (e.g., 0.8 nm/min for a 200 nm central array and 1.1 nm/min for a 500 nm centered array). The etch selectivity between Si and Cr is greater than 70:1. The etching process takes about 33 minutes and also removes about 33 nm from each side of column 14, leaving a column about 34 nm wide.

The chromium dot 12 is removed, using any highly selective Cr etch—for example, 6:1 H$_2$O:HF or 6:1 buffered oxide etch (BOE), which is available commercially. Column 14 is chemically cleaned and oxidized in dry O$_2$ at 800° C. for 30 minutes. The oxide layer is stripped in a buffered HF solution to obtain a clean surface. Since the oxide layer is about 4 nm thick, the column is now about 26 nm wide.

Figure 1D:
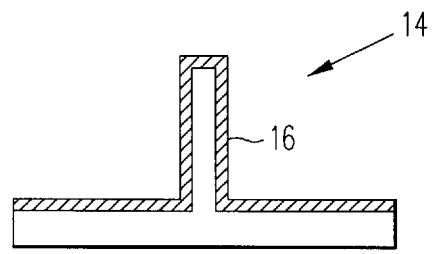

The dry oxidization at 800° C. is then continued for about 10 hours, at which point the oxidation becomes self-limiting and leaves a core of silicon less than 5 nm thick. Dry oxidation temperatures of up to about 950° C. can be used. Although the time required to reach the limited core thickness decreases with increasing temperatures, all columns retain cores after 10 hrs of oxidation. At temperatures above 950° C., the columns may be completely oxidized. Column 14 with an oxide layer 16 (not drawn to scale) is shown in FIG. 1D. The thickness of the silicon core depends on the thickness of the starting column, although this dependency appears to be less at higher temperatures. At 875° C., for example, beginning column diameters in the range of 20–40 nm yield cores having diameters in the range of 2–5 nm. Thus, starting with a column with a diameter 26 nm would yield a core with a diameter of about 3 nm.

Figure 1E:
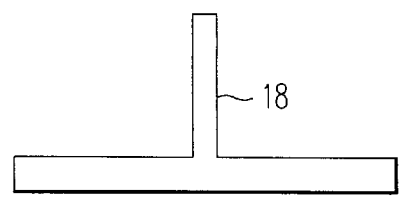

In the final step of the preparatory process, the oxide layer 16 is stripped with 6:1 BOE, leaving the thinned silicon column 18 shown in FIG. 1E, which can have a diameter of 5 nm or less but, as noted above, in this instance would have a diameter of about 3 nm.

The procedures for forming sub-5 nm column structures are further described in H. I. Liu et al., "Self-limiting oxidation of Si nanowires", *J. VAC. SCI. TECHNOL.*, 11 (6), 2532 (1993), and H. I. Liu et al., "Self-limiting oxidation for fabricating sub-5 nm silicon nanowires", *APPL. PHYS. LETT.*, 64 (11), 1383 (1994), both of which are incorporated herein by reference in their entirety.

Figure 2A:
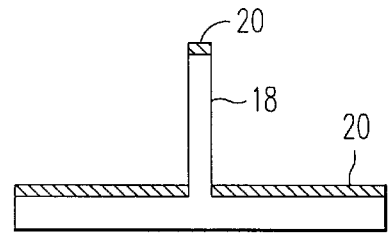

After the thinned silicon column has been formed, there are several alternative processes that can be used to fabricate the small aperture. A first set of process steps is illustrated in FIGS. 2A–2F. Initially, a chromium layer 20 is deposited onto substrate 10 and column 18 by evaporation. Chromium layer 20 is preferably about 100 Å thick. As shown in FIG. 2A, chromium layer 20 forms on the tip but not the sides of column 18.

Figure 2B:
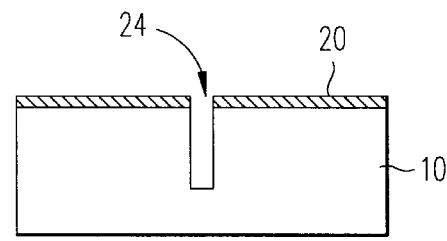
Figure 2C:
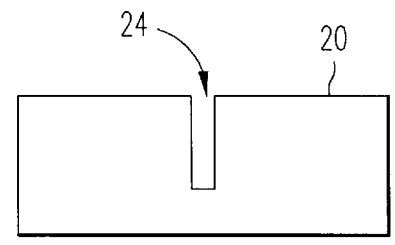

Silicon column 18 is etched in an isotropic plasma of, for example, SF$_6$ at 150 mTorr and 0.2 W/cm$^2$. As shown in FIG. 2B, this causes the chromium at the tip of column 18 to lift off and may leave a spike 22. Next the structure is etched in an NF$_3$ plasma, using the chromium layer 20 as a mask. As shown in FIG. 2C, this yields a pit 24 in substrate 10, having an entrance which coincides with the opening in chromium layer 20.

Figure 2D:
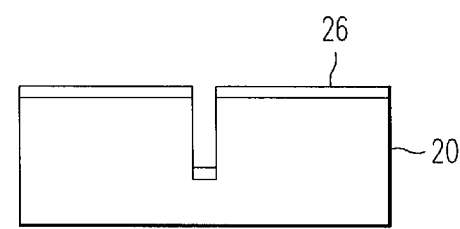
Figure 2E:
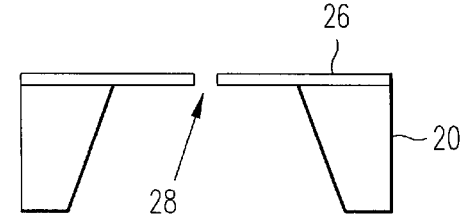

Chromium layer 20 is stripped in 6:1 BOE, as shown in FIG. 2D. Boron is implanted in the top surface of substrate 10 at a dose of $1 \times 10^{19}$ cm$^{-3}$ to form a doped layer 26 shown in FIG. 2E. Finally, the backside of substrate 10 is patterned and etched using an etchant such as EDP, TMAH or KOH which stops at the heavily doped layer 26. This yields the aperture 28 shown in FIG. 2F. Note that the thickness of the aperture 28 is determined by the thickness of doped layer 26 and the diameter of aperture 28 is determined by the diameter of the thinned silicon column 18. Since both the depth of the boron implantation used to form doped layer 26 and the diameter of the silicon core used to form column 18 can be controlled to a significant extent, the dimensions of aperture 28 are highly reproducible.

If desired, the patterning of the backside of substrate 10 can be performed at an earlier stage of the process, or even before the process begins.

Figure 3A:
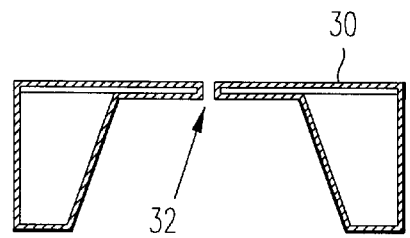
FIGS. 3A and 3B illustrate optional additional steps for reducing the diameter of the aperture formed by the process of FIGS. 2A–2F.
Figure 3B:
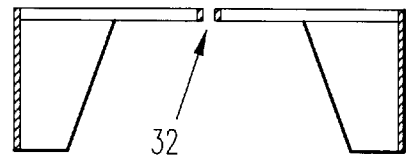

FIGS. 3A and 3B show additional process steps which can be used to reduce the diameter of aperture 28. In FIG. 3A, an oxide layer 30 has been grown over the entire exposed surface of the structure, producing a smaller aperture 32. This also passivates the entire surface, which has advantages in certain applications. A possible disadvantage is that the thickness of the aperture is increased, but this can be overcome by stripping the oxide in a 14:1 Freon23:O2 250 mTorr, 1 W/cm$^2$ plasma with a DC bias of 0.2 W/cm$^2$. The plasma attacks only the oxide on the flat surfaces, reducing the thickness of the aperture 32 but leaving the diameter of the aperture unchanged. Since the formation of oxide layer 30 consumes some of the doped layer 26, the thickness of the aperture ends up being slightly less than the original thickness of doped layer 26.

Figure 4:
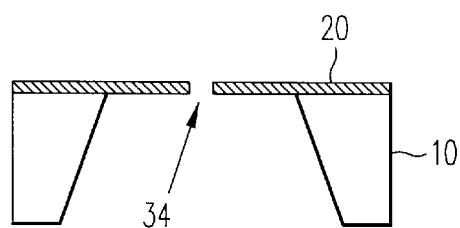
FIG. 4 illustrates an aperture according to a second embodiment of this invention, wherein the thickness of the aperture is determined by the thickness of a metal layer.

In an alternative process, the backside of the substrate 10 is etched immediately after the chromium layer 20 has been deposited (FIG. 2C). This yields an aperture 34, shown in FIG. 4, with a thickness which is determined by the thickness of chromium.layer 20 and a diameter which is determined by the diameter of silicon column 18. Chromium layer 20 is preferably formed by evaporation, and its thickness is therefore controllable. The dimensions of aperture 34 are therefore reproducible.

Another metal may be substituted for the chromium in layer 20 so long as it is capable of serving as an etch stop for the backside etch. If titanium is used, it can be oxidized to form an insulating layer.

Figure 5A:
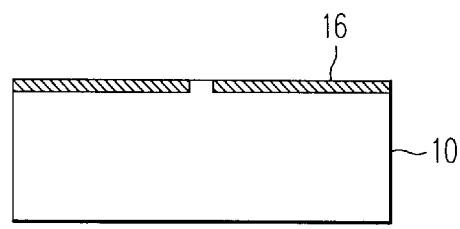
FIGS. 5A–5C illustrate the steps of a process according to a third embodiment of this invention, wherein the thickness of the aperture is determined by the thickness of an oxide layer.
Figure 5B:
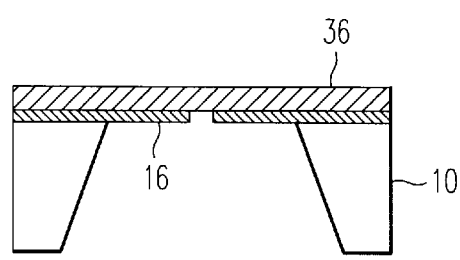
Figure 5C:
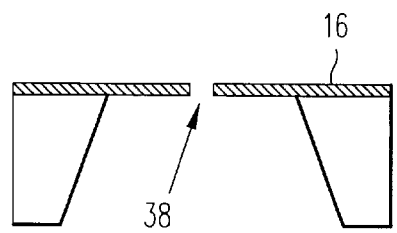

In yet another alternative process, the oxidized silicon column 14, shown in FIG. 1D, is broken off by lightly polishing the frontside of substrate 10. The resulting structure is shown in FIG. 5A. Next, the frontside of substrate 10 is passivated with a polyimide layer 36 and, as shown in FIG. 5B, the backside of substrate 10 is patterned and etched. As shown in FIG. 5C, polyimide layer 36 is removed leaving an aperture 38. In this process, both the diameter and thickness of aperture 38 are determined by the oxidation that is used to form silicon column 18 (FIG. 1D). The delicate silicon column 18 does not need to remain standing for further processing. Also, the oxide layer 16 in which aperture 38 is formed is insulating.

While specific embodiments of this invention have been described, these descriptions should be viewed as only illustrative of the broad principles of this invention, and not limiting. The full scope of this invention is defined solely in the following claims.

We claim:

1. A method of forming an aperture comprising:
   providing a substrate;
   fabricating a column, said column extending from a frontside of said substrate;
   depositing a metal layer on said frontside of said substrate, said metal layer covering a tip of said column but not covering a sidewall of said column;
   applying at least one etchant which attacks said substrate, thereby causing a portion of said metal layer covering said tip of said column to lift off and forming a pit in said substrate; and
   removing material from a backside of said substrate so as to form an aperture.

2. The method of claim 1 wherein removing material from a backside of said substrate comprises using said metal layer as an etch stop.

3. The method of claim 1 further comprising removing said metal layer and implanting dopant in said frontside of said substrate to form a doped layer.

4. The method of claim 3 wherein removing material from a backside of said substrate comprises using said doped layer as an etch stop.

5. The method of claim 4 further comprising oxidizing said doped layer so as to form an oxide layer and thereby reduce the diameter of said aperture.

6. The method of claim 5 further comprising removing a portion of said oxide layer on the frontside of said substrate.

7. The method of claim 3 wherein said dopant comprises boron.

8. The method of claim 1 wherein applying at least one etchant which attacks said substrate comprises applying a first etchant to cause said portion of said metal layer covering said tip of said column to lift off and applying a second etchant to from said pit.

9. The method of claim 1 wherein said substrate comprises silicon.

10. The method of claim 1 wherein said metal layer comprises chromium.

11. The method of claim 1 wherein fabricating a column comprises:
    fabricating a first column extending from said frontside of said substrate;
    oxidizing said first column to form an oxide layer in said first column; and
    removing said oxide layer to form a column, the column being less thick than the first column.

12. The method of claim 11 wherein fabricating a thick column comprises depositing a metal dot on a surface of said substrate and etching a portion of said substrate using said metal dot as a mask.

13. The method of claim 12 wherein said metal dot comprises chromium.

14. A method of forming an aperture comprising:
    providing a substrate;
    fabricating a column, said column extending from a frontside of said substrate;
    forming an oxide layer on said column and said frontside;
    removing said column; and
    etching a backside of said substrate to form an aperture.

15. The method of claim 14 further comprising depositing a passivation layer on said oxide layer prior to etching a backside of said substrate.

16. The method of claim 15 further comprising removing said passivation layer following said step of etching a backside of said substrate.

17. A method of forming an aperture comprising:
    providing a silicon substrate;
    depositing a metal dot on a surface of said silicon substrate;
    applying a first etchant to said surface so as to form a first column extending from a frontside of said substrate;
    oxidizing said first column to form a first oxide layer therein;
    removing said first oxide layer to form a column, the column being less thick than the first column;
    depositing a chromium layer on said frontside and a tip of said column;
    applying a second etchant to from a spike extending from said substrate;
    applying a third etchant to form a pit in said substrate;
    removing said chromium layer;
    implanting a layer of dopant in said frontside; and
    applying a fourth etchant to a backside of said substrate to form an aperture, said layer of dopant acting as an etch stop for said fourth etchant.

18. The method of claim 17 further comprising forming a second oxide layer on said layer of dopant to reduce the diameter of said aperture.

19. The method of claim 18 further comprising removing a portion of said second oxide layer from said layer of dopant on the frontside of said substrate to reduce a thickness of said aperture.

20. A method of forming an aperture comprising:
    providing a silicon substrate;
    depositing a metal dot on a surface of said silicon substrate;
    applying a first etchant to said surface so as to form a first column extending from a frontside of said substrate;

oxidizing said first column to form a first oxide layer therein;

removing said first oxide layer to form a column, the column being less thick than the first column;

depositing a chromium layer on said frontside and a tip of said column;

applying a second etchant to form a spike extending from said substrate;

applying a third etchant to form a pit in said substrate; and applying a fourth etchant to a backside of said substrate to form an aperture, said chromium layer acting as an etch stop for said fourth etchant.

21. A method of forming an aperture comprising:

providing a silicon substrate;

depositing a metal dot on a surface of said silicon substrate;

applying a first etchant to said surface so as to form a column extending from a frontside of said substrate;

oxidizing said column and said substrate to form an oxide layer in said column and in said frontside;

removing said column;

depositing a polyimide layer over said oxide layer; and applying a second etchant to a backside of said substrate to form an aperture, said oxide layer acting as an etch stop for said second etchant.

* * * * *